United States Patent [19]
Evans et al.

[11] 3,710,576
[45] Jan. 16, 1973

[54] DUAL CLUTCH FREE TURBINE ENGINE

[76] Inventors: Duane E. Evans, 2125 Wellington Drive, Peoria, Ill. 61611; David A. Tyler, 2225 N. Bigelow St., Peoria, Ill. 61604; Myron R. Gibson, Rural Route No. 1, Box 73, Edelstein, Ill. 61526

[22] Filed: Feb. 22, 1971

[21] Appl. No.: 117,546

Related U.S. Application Data

[63] Continuation-in-part of Ser. No. 777,278, Nov. 20, 1968, abandoned.

[52] U.S. Cl. ............... 60/39.03, 60/39.16, 60/39.27
[51] Int. Cl. ................................................. F02c 9/00
[58] Field of Search ........................ 60/39.16, 39.28

[56] References Cited

UNITED STATES PATENTS

| | | | |
|---|---|---|---|
| 3,098,356 | 1/1963 | Joline | 60/39.28 T |
| 3,188,807 | 6/1965 | Rogers | 60/39.16 |
| 3,237,404 | 3/1966 | Flanigan | 60/39.16 |
| 3,368,347 | 2/1968 | Wickman | 60/39.16 |

*Primary Examiner*—Carlton R. Croyle
*Assistant Examiner*—Warren Olsen
*Attorney*—Charles M. Fryer et al.

[57] ABSTRACT

A dual clutch free turbine engine and the control means therefore wherein power transfer operates closed-loop on gasifier turbine temperature and dynamic braking operates closed-loop on power turbine speed and both operations are accomplished through a dual clutch power transfer system. A compressor blow-off through the heat exchanger takes place in a modulated manner during dynamic braking.

16 Claims, 9 Drawing Figures

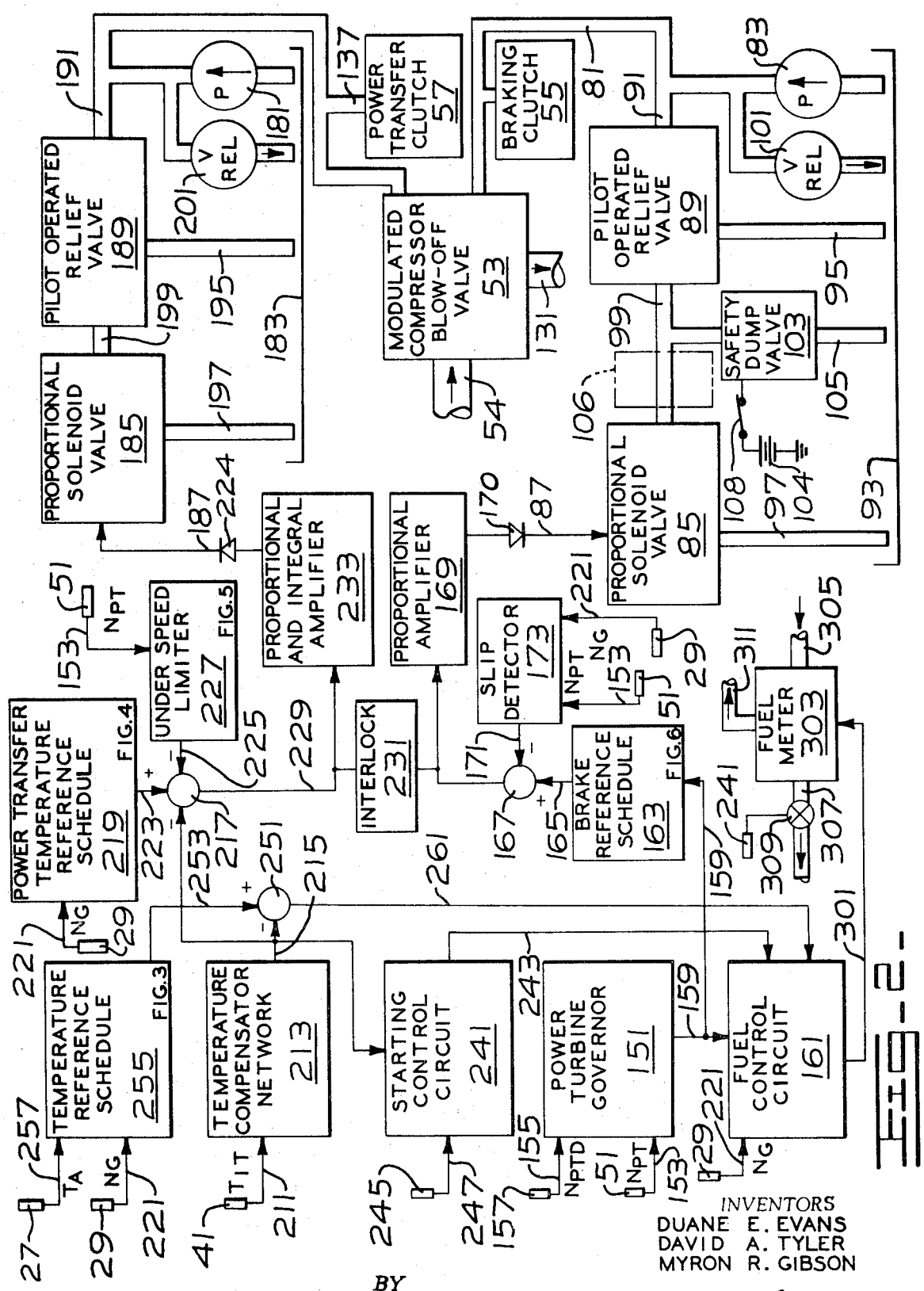

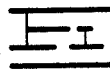
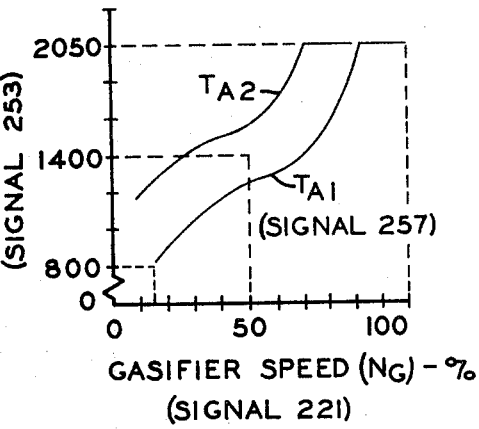
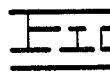
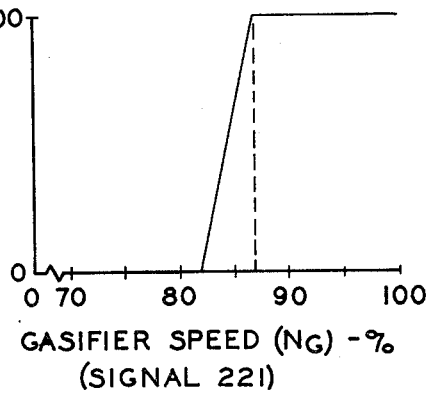
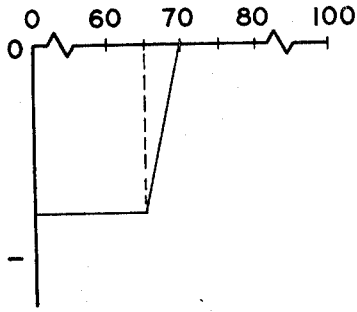
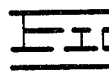
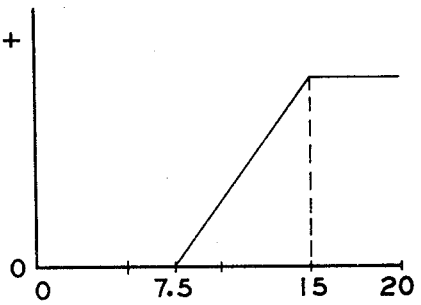
INVENTORS
DUANE E. EVANS
DAVID A. TYLER
MYRON R. GIBSON
BY
ATTORNEYS

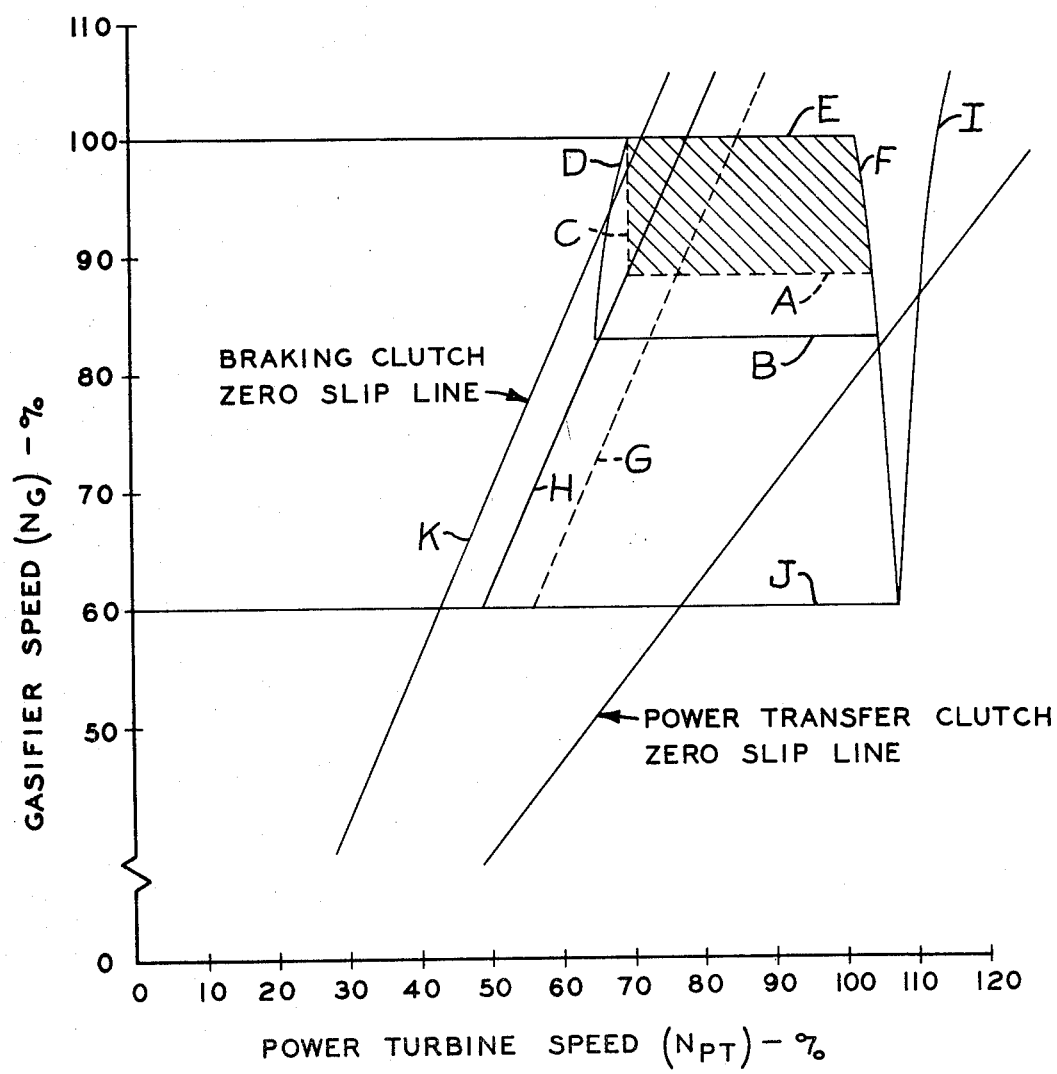

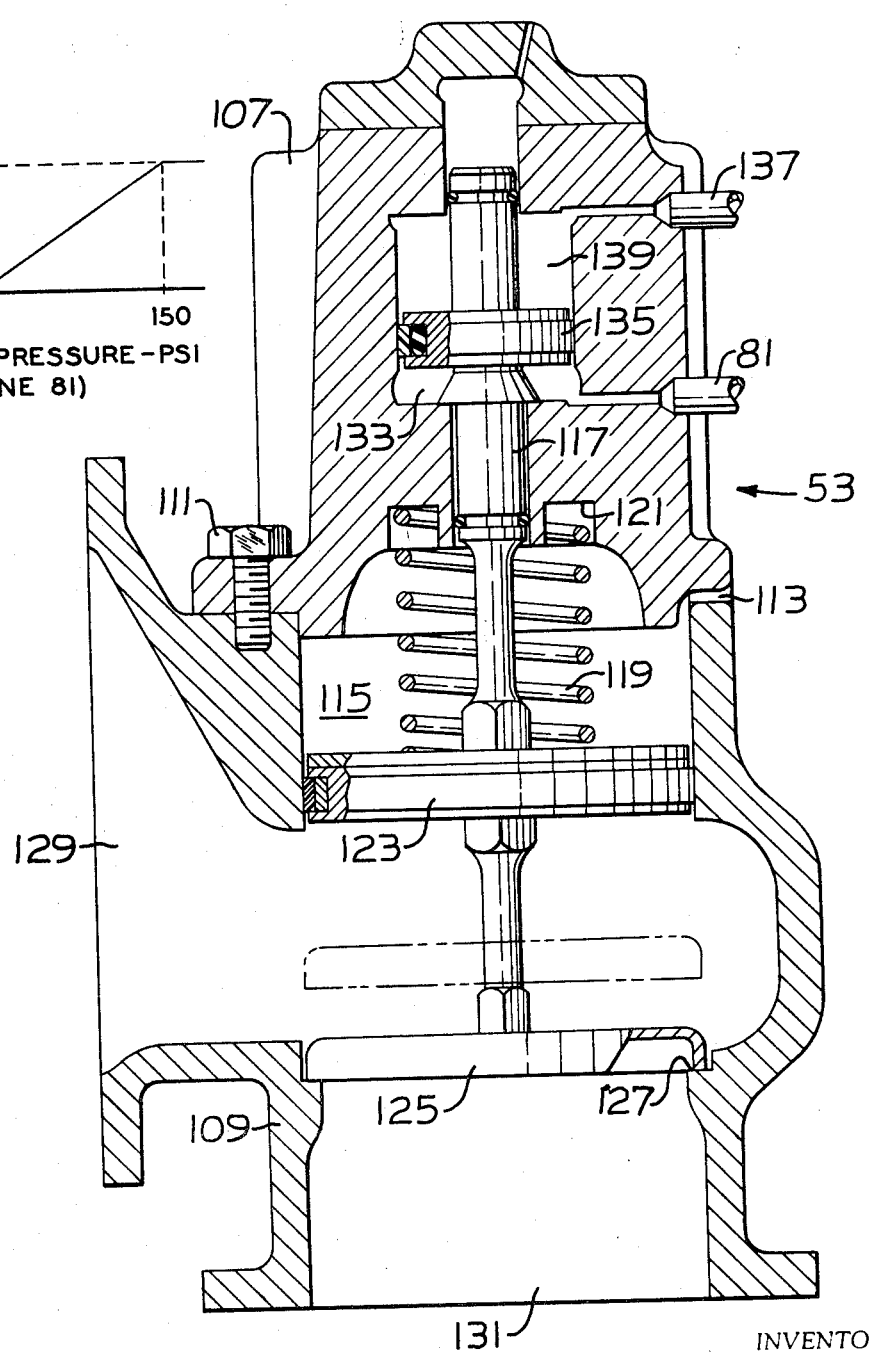

DUAL CLUTCH FREE TURBINE ENGINE

This is a continuation-in-part of application Ser. No. 777,278, filed Nov. 20, 1968, and now abandoned.

This invention relates to gas turbine engines and the controls therefor.

A basic gas turbine engine cycle comprises the steps of compressing the gas, heating it, allowing it to expand, and exhausting it from the system. In general, the compression takes place in a rotating compressor, the heating in a combustion chamber, and the expansion in a turbine assembly.

In operation, air enters the engine and is compressed by a rotating compressor, causing an increase in the air's pressure, temperature, and density. The compressed air is directed to the combustion chamber where it is further heated by the combustion of fuel. The gases resulting from the combustion of the fuel in the compressed air then expand rapidly through the turbine assembly, applying a force to the blades and causing them to rotate. Removal of the gases from the engine then takes place either by exhausting directly to the atmosphere or, in more advanced engines, by passing through a heat exchanger situated between the compressor and the combustion chamber, and then exhausting to the atmosphere. This latter method further serves to heat the compressed air passing through the heat exchanger before it enters the combustion chamber, thereby increasing the efficiency of the engine.

A basic turbine configuration, known as a single-shaft turbine, has the compressor, turbine assembly, and output drive or load on a common shaft. The single-shaft turbine offers good speed stability but poor natural torque characteristics. Due to the use of a single shaft, load changes are immediately sensed and compensated for. Rated speed can be precisely maintained until the load increases to the point of lug, at which point the compressor is slowed, causing a decrease in air inlet supply which results in decreased power output and, finally, stall.

A more advanced system, known as a free turbine, incorporates the compressor and one turbine assembly on a single shaft. This component assembly is known as a gasifier. A second turbine, referred to as a power turbine, is mounted on a second shaft in such a position that the gases leaving the gasifier turbine also pass through it. The only physical connection between the gasifier and power turbines is the expanding hot gases. The output drive is also mounted on the second shaft; as the load is increased, causing lug, the gasifier can maintain full speed and power. As the output shaft decreases in speed to a complete stall—a desirable characteristic when it is directly attached to a vehicle drive—the applied torque will increase to a maximum, thus allowing continuous efficient operation of the gasifier. An engine utilizing the modulated dual clutch system, such as that disclosed herein, will produce improved response during shifting transients when the vehicle employs a multi-gear ratio mechanical transmission.

Both single shaft and free turbine engines have been found to have a higher specific fuel consumption than other types of engines under light load conditions, while both are highly efficient under full load conditions.

For purposes of ease of definition, throughout the remainder of this specification, the term "engine," used alone, shall be understood to mean a free turbine engine employing exhaust energy recovery unless specifically stated otherwise.

One method of improving the operating efficiency of an engine under part load conditions is to extract power from the gasifier and apply it to the load. The function of such a power transfer arrangement is to maintain the maximum cycle temperature at a high level which in turn maintains a high level of potential thermal efficiency.

In an engine having fixed turbine geometry without power transfer, all reductions in power output must be accomplished by a reduction in fuel flow. This results in a reduced turbine inlet temperature and, therefore, a lowered thermal efficiency. On the other hand, utilization of power transfer to maintain a high thermal efficiency in the gasifier and employment of the resultant energy in excess of that required to power the compressor to assist in powering the partial load allows the maintenance of higher thermal efficiency during partial load operation.

It is therefore an object of the present invention to improve the specific fuel consumption of an engine operating under part-load conditions by extracting power from the gasifier and delivering it to the load.

It is also an object hereof to improve the specific fuel consumption of an engine operating under part-load conditions by extracting power from the gasifier and delivering it to the load.

Line advances in the art of temperature transducers have provided the means necessary to produce a more direct and economical method of controlling power transfer by means of PT exceeds approximately by 100 temperature percent of rated speed. This temperature may be measured at the gasifier inlet, outlet, or at the turbine itself.

It is therefore an object of this invention to provide a more direct and economical control of power transfer in an engine than heretofore employed.

It is also an object of the invention to provide an improved method of controlling power transfer in such an engine.

Another advantage which may be found in the utilization of an engine is that commonly known as dynamic braking. Dynamic braking is, simply speaking, the reverse of power transfer in that power from the load or the power turbine may be returned to the gasifier so as to be dissipated within the engine. Dynamic braking may be utilized to aid in retarding a vehicle when the operator releases the accelerator. For example, when a vehicle is traveling downhill and the operator releases the accelerator, the fuel delivered to the combustion chamber is decreased. The energy available from the vehicle, however, causes a force to enter into the engine and, through suitable mechanical means, to be dissipated by driving the compressor.

Dynamic braking is also important in an engine of the type embodied in this disclosure when the engine is powering a load through a transmission and shifting from one gear range to another occurs. The release of the load from the power turbine would, if unchecked, result in a severe overspeed. However, the dynamic braking system will cause the power turbine available energy to be delivered back to the compressor for dissipation, thereby obviating this problem.

In both of these dynamic braking cases, the driving of the compressor by excess available energy in the power turbine section causes the compressor to continue to act upon large amounts of air. If this air is discharged to the atmosphere, the energy dissipation is complete since it adds no working energy to the system.

Although dynamic braking is not unknown in the prior art, it has not heretofore been utilized in its full potential. Earlier systems usually provided a direct lock-up at a fixed speed ratio between the gasifier and the power turbine. This results in a complete lack of speed control other than through the operator-controlled throttle, thereby burning additional fuel when reducing the braking effort. Also, in prior systems, a significant amount of dynamic braking resulted only from a large power turbine over-speed; therefore, either the power turbine must be over-designed or the braking must be limited to a very small amount.

In the structure and method presented here however, the dynamic braking system is modulated so as to provide a much larger range of operational capability and it also provides a suitable means for synchronizing power turbine speed to the vehicle transmission speed during shifting. The gears in a vehicle utilizing this system can be shifted in the same manner as can those powered by a competitive diesel engine, while requiring fewer speeds in a manual shift, synchronous transmission, and the recovery and acceleration after shifting will be quite rapid since the gasifier speed will be maintained very near its rated speed throughout the shift period.

It is therefore an object of this invention to provide a free turbine engine utilizing a dynamic braking system for dissipating excess power into the compressor of the engine.

It is also an object of this invention to provide such an engine wherein the dynamic braking is modulated, thereby providing greater control of the engine.

It is a further object hereof to provide a method of dissipating excess engine power in a gas turbine engine, in a modulated manner.

As stated previously, if the air acted upon by the compressor during dynamic braking is discharged to the atmosphere, it adds no energy to the system and the energy dissipation is complete. However, this discharged air has been found to be useful in performing other functions if, instead of being discharged directly to the atmosphere, it is passed to the inlet side of the heat exchanger. This will cause a more rapid cooling of the heat exchanger and a reduction in the noise it would otherwise cause upon discharge due to its sonic pressure ratio relative to the atmosphere.

Thus, as the air leaves the compressor during dynamic braking, that portion not passing to the combustion chamber may be bled off into the inlet gas side of the heat exchanger. As the heat exchanger cools due to this event, the air leading to the combustion chamber will not be heated by the exchanger, a reduced amount of air is delivered to the combustion chamber, and, since there is also a considerable reduction of fuel flow during dynamic braking, a large reduction in the motive force acting on the power turbine will occur.

The device for discharging the air is commonly known as a compressor blow-off (CBO) valve and, although it may be opened at any time during the occurrence of dynamic braking, it must be closed below 75 percent of the rated gasifier speed since otherwise the temperature at the gasifier turbine would become excessive even with minimum fuel flow.

In actual use it is not necessary to discharge the air through the CBO valve when minimal dynamic braking is desired, but rather it is better to utilize the valve in a modulated manner which is determined by the level of dynamic braking desired.

Therefore, it is an object of this invention to provide a free turbine engine wherein power may be transferred from a gasifier turbine to the load, and the method for performing this transfer.

It is also an object of this invention to provide such an engine employing exhaust heat recovery with a modulated compressor blow-off valve controlled by the dynamic braking clutch system so that it is modulated in the same manner as the dynamic braking clutch.

It is also an object of this invention to provide a free turbine modulated dynamic braking system and method of operation thereof wherein excess power at the power turbine or load may be dissipated within the gasifier.

It is also an object of this invention to provide an engine having a dynamic braking system with a means for actuating the dynamic braking if any electrical power disruption should occur in the engine control system.

It is a further object of this invention to provide such a power transfer system and method of control thereof wherein power transfer occurs as a function of the temperature at the gasifier turbine, its inlet, or its outlet.

It is also an object of this invention to provide a modulated dynamic braking system and method of operation thereof wherein dynamic braking occurs as a function of the demanded power turbine rotative speed.

It is a further object of this invention to provide such a method and system wherein the power transfer and dynamic braking capability of the engine is vastly improved through the use of a dual clutch system.

It is also an object of this invention to provide an improved method of power dissipation in the gasifier of an engine together with the apparatus to practice such a method.

It is an object of this invention to provide a gasifier power dissipation system which produces retardation of the vehicle during deceleration thereof.

It is an object of this invention to provide an engine having a modulated compressor blow-off system wherein energy is dissipated by passing compressed air into the gas inlet side of the engine heat exchanger.

It is also an object of this invention to provide an engine and control system, therefore, wherein power is dissipated by passing compressed air into the gas inlet side of the engine heat exchanger.

It is a further object of this invention to provide such a blow-off system wherein the compressed air is passed through the heat exchanger in proportion to the desired dynamic braking.

It is also an object of this invention to provide an engine having a balanced area proportional compressor blow-off valve with an isentropic flow area which is modulated hydraulically, and a method for modulating it.

It is a further object of this invention to provide an engine having a balanced area proportional compressor blow-off valve with an isentropic flow area which is hydraulically modulated to the desired level of dynamic braking.

It is a still further object of this invention to provide an engine having a dual clutch system to transmit torque in two directions for a given relationship between the gasifier and power turbine speeds and a method for controlling the clutches in response to those speeds.

It is also an object of the invention to provide such a dual clutch system having proportional solenoid valves and pilot operated relief valves for actuation of the clutches.

It is also an object of this invention to provide an engine control system wherein dynamic braking will occur automatically when vehicle power is interrupted.

It is an object of this invention to provide an engine in which the period of influence of the "heat sink" effect of the heat exchanger, which causes a delay in the response of the engine to a new throttle setting, is reduced.

It is a further object of this invention to provide an engine having a broader dynamic braking range than previously available and a method for controlling the operation within such a range.

It is also an object of this invention to provide such an engine wherein fewer transmission speeds are required for synchronous speed shifting with a manual transmission.

It is an object of this invention to provide an engine with a dynamic braking system and method of operation thereof wherein fewer speeds are required for synchronous shifting of a manual shift transmission.

It is also an object of the invention to provide such an engine having modulated dynamic braking for transmission shifting purposes.

It is an object of this invention to provide an engine and method of operation thereof wherein power transfer is achieved as a function of the temperature at the gasifier turbine, its inlet, or its outlet, biased by the gasifier speed and the power turbine speed.

It is a further object hereof to provide a method of controlling dynamic braking in such an engine by means of the relative speeds of the turbines.

It is also an object of this invention to provide such an engine wherein dynamic braking is controlled by power turbine speed, modified and modulated by a slip detector for determining the difference between power turbine and gasifier speeds.

Other objects of the invention will become apparent to those skilled in the art upon perusal of the following description in light of the accompanying drawings which illustrate a preferred embodiment of the invention. Other embodiments using similar or equivalent structure will become obvious to those skilled in the art, without departing from the present invention as defined in the appended claims.

IN THE DRAWINGS:

FIG. 2 is a schematic illustration of the electrical circuitry of the invention together with the hydraulic circuitry which it controls;

FIG. 3 is a graphical illustration of the function performed by the temperature reference schedule of the invention;

FIG. 4 is a graphical representation of the function performed by the power transfer temperature schedule of the invention;

FIG. 5 is a graphical representation of the function performed by the underspeed limiter of the invention;

FIG. 6 is a graphical representation of the function performed by the brake reference schedule of the invention;

FIG. 7 is a graphical representation of an engine performance with dual clutch power transfer and braking;

FIG. 8 is a sectional view of the CBO valve used in the preferred embodiment of this invention; and FIG. 9 is a graphical representation of the function performed by the CBO valve.

GENERAL ENGINE CONFIGURATION

Figure 1:
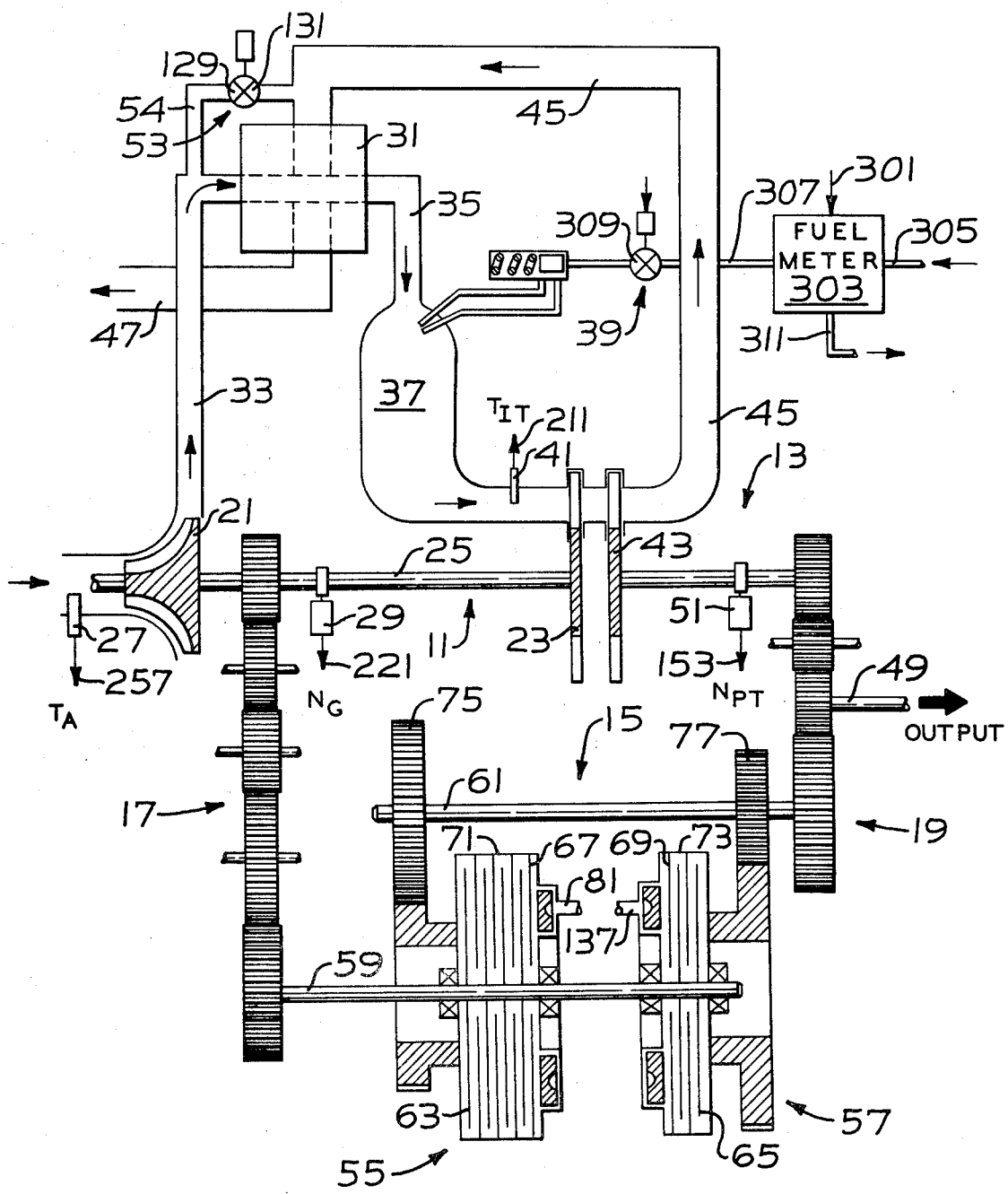
FIG. 1 is a schematic illustration of an engine utilizing the invention.

Referring now to the drawings which illustrate the elements of a preferred embodiment of the invention in detailed form, an engine of the general type previously described is shown in FIG. 1. This engine comprises an independently rotatable gasifier 11 and a power section 13. The gasifier and power sections may be mechanically coupled by means of a dual clutch system 15 operatively connected to gear trains 17 and 19.

Basically, the gasifier comprises a compressor 21 which is driven by the gasifier turbine 23 via a shaft 25.

For reasons to be explained later, the ambient temperature, i.e., the temperature of the air in the surrounding atmosphere, is measured by a probe 27 and the gasifier speed is measured by any suitable measuring device 29, such as a magnetic pick-up, tachometer-generator, etc.

Air entering the compressor 21 is directed to a heat exchanger 31 through a passage 33. The air, which has been heated due to the compression is further heated in the heat exchanger and then directed through passage 35 to a combustion chamber 37 which is also provided with fuel by a system generally shown at 39. The combustion of the fuel in chamber 37 converts the fuel and air to a very hot pressurized gas. The tendency of the gas to expand causes it to pass through the vanes of the gasifier turbine 23. As the gas passes through the turbine 23, it applies a motive force to the gasifier causing it to rotate.

At this point in the system, the temperature of the products of combustion must be measured by a temperature probe 41 for reasons which will become apparent later. The probe has been illustrated as measuring the temperature at the gasifier turbine inlet and the remainder of this description is based upon the measurement being made there. This invention anticipates measurement of the temperature at the gasifier turbine exhaust or at the turbine itself, however, and those skilled in the art will realize that the only change which will result from moving the probe to one of those positions is that the various schedules, etc., which operate as a function of the temperature at this point, must be modified slightly. For purposes of explanation and illustration, however, probe 41 will be considered to be placed in the gasifier turbine inlet. When the term "gasifier turbine temperature," or similar wording, is used, it shall be understood that the temperature is being measured at any desired position at the turbine, its inlet, or its outlet. Further, the term "$T_{IT}$", which will be defined later, should be construed as the gasifier turbine inlet temperature, and the term "$T_G$" as the gasifier turbine temperature, regardless of the point of measurement.

Continuing in its tendency to expand, the gas passes through the vanes of power turbine 43 of the power section 13. After passing through the power turbine, the gas is directed through a passage 45 and into heat exchanger 31 where it heats the incoming compressed air in a well known manner. The gas is then exhausted to the atmosphere via a passage 47.

The energy of the gas passing through power turbine 43 drives the power section 13 and the drive train 19, thereby powering output shaft 49. The power section speed is measured by a measuring device 51 which may be similar to the device 29.

A compressor blow-off (CBO) valve 53 is situated in a passage 54 and passes compressed air from passage 33 to passage 45 when required during dynamic braking. Since when actuated, the CBO valve delivers compressed air to the heat exchanger gas inlet rather than directly to the atmosphere, the noise caused by the escape of the air is greatly diminished and the temperature differential between the gas and air sides of the heat exchanger is rapidly reduced.

The dual clutch unit 15 allows mechanical coupling of the gasifier 11 and the power section 13 under particular speed relationships. The unit 15 comprises a braking clutch 55 and a power transfer clutch 57 which function in accordance with the relative rotative speeds of the gasifier and power sections and with the relative speeds of shafts 59 and 61 driven by the gasifier and power sections respectively. Both clutches are of the disc-type through which power can be transmitted only from the faster member to the slower member.

Clutch plates 63 and 65 of the braking and power transfer clutches respectively rotate with shaft 59 and are axially slidable relative to it. Clutch plates 67 and 69 rotate with the clutch drums 71 and 73 respectively. When shaft 59 is rotating at a greater speed than is power transfer clutch drum 73, power may be transferred from the gasifier to the output shaft 49 via gear train 17, shaft 59, power transfer clutch 57, gear 77, shaft 61, and a portion of power train 19. When shaft 59 is rotating at a lower speed than that of the brake clutch drum 71, a braking force may be transferred from power turbine 43 or load shaft 49 to the gasifier via gear train 19, shaft 61, gear 75, brake clutch 55, shaft 59 and gear train 17.

The dynamic braking effect will be performed as a function of power turbine speed ($N_{PT}$) as measured by means 51 and the power transfer effect will be performed as a function of turbine inlet temperature ($T_{IT}$) as measured by means 41.

DYNAMIC BRAKING

The dynamic braking system will be actuated when the error between the actual power turbine speed and the power turbine speed demanded by the vehicle operator exceeds a predetermined percentage of the demanded power turbine speed. This percentage of demanded power turbine speed is known as the actuation threshold value and, for purposes of illustration, shall be deemed to be approximately 7½ percent. When the error signal reaches the actuation threshold value, the braking system begins to transmit torque from gear train 19 to the gasifier 11 in proportion to the size of the signal. The braking is modulated throughout a predetermined range of values of the error signal until, when the signal reaches a certain value, a maximum amount of torque is transmitted for that and any greater value. For purposes of illustration: no dynamic braking will occur when the error signal is less than about 7½ percent of demanded power turbine speed; dynamic braking will be modulated when the error signal is between 7½ and 15 percent; dynamic braking will be at a maximum for all error signals greater than about 15 percent.

Referring now to FIG. 2, there is shown a hydraulic line 81 for the passage of fluid to the CBO valve 53 and the braking clutch 55. Fluid is supplied to line 81 by a pump 83, driven by the engine accessory gear train, when a proportional solenoid valve 85 is energized by a signal 87 directed to it. The proportional solenoid valve 85 drives a pilot-operated relief valve 89 that is provided with hydraulic fluid from pump 83 via line 91. Valve 89 comprises a conventional pilot-operated relief valve, e.g., Vickers Inc., Part No. CG–03–B. Excess fluid is returned to a sump 93 from the relief valve 89 and solenoid valve 85 via drain lines 95 and 97, respectively.

In operation, the solenoid valve may be of the normally open type which is powered closed when it receives signal 87 or it may be of the normally closed type which is powered open when it receives the signal. In either case, when it is in its normal position, the pilot-operated relief valve 89 is positioned so that fluid moved by pump 83 passes through line 91, valve 89, and line 95 back to sump 93. When the valve 85 is acted upon by signal 87, valve 89 is acted upon by the hydraulic fluid in line 99 between the valves. This fluid enters into line 99 from pump 83 by way of line 91, and an internal passage in valve 89. This fluid positions valve 89 such that, when the actuation threshold value of the error signal (7½ percent) is reached, fluid begins to be restricted in its flow in line 91, thus increasing the fluid pressure in line 81 to clutch 55. As the error signal increases, the position of valve 89 changes to restrict the flow through lines 91 and 95 in proportion to the error and proportionately more pressure results in line 81. When the error signal reaches 15 percent, the maximum level of pressure occurs in line 81 to clutch 55 and, subject to the limitation of relief valve 101, maximum torque is transmitted to the gasifier.

A safety dump valve 103 is placed in the system as shown in FIG. 2 when valve 85 is of the normally closed type. Valve 103 is of the normally closed type and is held open by an electrical signal communicated from electrical source 104. If electrical power is lost in the vehicle for any reason, valve 103 will open and dump the fluid in line 99 through line 105 and thereby allow the relief valve 89 to position itself so that the braking clutch is actuated. A switch 108 is conveniently located between valve 103 and electrical source 104 to enable manual de-energizing of valve 103. If valve 85 is of the normally open type, a safety valve may be positioned as shown in phantom at 106, and the line 105 and dump valve 103 removed from the circuit.

Fluid pressure in line 81 also communicates with modulated CBO valve 53 and when the dynamic braking clutch 55 is actuated in a predetermined amount, the CBO valve will be opened by the hydraulic force, in a manner to be described below, and compressed air will flow through passage 54 to the heat exchanger 31 (FIG. 1).

COMPRESSOR BLOW-OFF

A preferred embodiment of the CBO valve 53 is shown in section in FIG. 8. The valve is normally closed and is opened by the pressure acting upon it through line 81. As shown, the valve comprises upper and lower body portions 107 and 109 which are held together by suitable means such as bolts 111. At the interface of the body portions, several apertures 113 are situated about the periphery of the valve to allow venting of compartment 115 upon movement of the valve spool 117. A spring 119, acting between a surface 121 in upper body portion 107 and the upper surface of a spool piston 123, serves to bias the valve spool to a position such that the valve disc 125 is held against valve seat 127 so as to interrupt the passage of compressed air from the valve inlet 129 to the outlet 131. Manufacturing disc 125 and piston 123 to be of equal areas will preclude the force exerted by the compressed air from moving the spool in either direction.

As the rising hydraulic pressure in line 81 actuates the dynamic braking clutch, it also fills a cylindrical chamber 133 on one side of a piston 135 on valve spool 117. A hydraulic line 137 similarly provides fluid to a chamber 139 on the opposite side of piston 135 in a manner to be described later. Therefore, the pressure in chamber 133 must overcome the pressure in chamber 139 as well as the biasing force of spring 119 in order to move the valve disc 125 away from the seat 127.

Thus, the dynamic braking clutch will begin to transfer torque to the gasifier before the CBO valve opens. As shown in FIG. 9, the fluid motivating the brake clutch 55 does not open the valve until it reaches a pressure of predetermined minimum value; it then opens the valve in a proportional amount until a second predetermined pressure is attained at which point the valve is maintained in a fully opened position for that or any greater pressure. The values of such predetermined pressures are, for example, 55 psi for the predetermined minimum value and 150 psi for the second predetermined value.

With reference again to FIG. 2, there is shown a power turbine governor 151 which receives an actual power turbine speed signal ($N_{PT}$) 153 from the measuring device 51 and a demand power turbine speed signal ($N_{PTD}$) 155 from the accelerator 157 at the operator's console. Although not shown in detail, the accelerator may comprise a potentiometer or the non-sliding contact type of electrical transducer.

The error between actual ($N_{PT}$) and demanded ($N_{PTD}$) power turbine speeds establishes a signal 159 which is fed to the fuel control circuit 161 and to the brake reference schedule 163. The function of the brake reference schedule is shown in FIG. 6; when the error between $N_{PT}$ and $N_{PTD}$ exceeds 7½ percent of rated power turbine speed, the schedule 163 transmits a brake signal 165 proportional to the error until the error reaches 15 percent, at which point the signal becomes constant. Signal 165 having a given reference direction is fed through a summing junction 167 to proportional amplifier 169 and thence through diode 170 as signal 87. The function of this diode or other biasing means placed in series with amplifier 169 will be hereinafter described.

Summing junction 167 also receives a speed variation signal 171 having a reference direction opposite to the reference direction of signal 165. Speed variation signal 171 is received from slip detector 173 which is responsive to signals 153 and 221 from the power turbine ($N_{PT}$) and gasifier speed ($N_G$) measuring devices 51 and 29, respectively. When the speed variation between the power turbine and gasifier driven elements (drum 71 and shaft 59, respectively) decreases to less than a predetermined amount, for example 440 rpm, the slip detector will provide a signal 171 to junction 167 such that the brake signal 165 will be reduced at the junction in relation to the size of signal 171. In other words, signals 165 and 171 having opposite reference directions will be summed and signal 165 will be effectively reduced by oppositely directed signal 171. When the speed variation decreases to less than a second predetermined amount, for example 210 rpm, the signal 171 will be such that no braking signal 87 will be provided to valve 85 regardless of the amount of error between $N_{PT}$ and $N_{PTD}$. In other words, no dynamic braking will occur unless the speeds of the power turbine and gasifier driven elements are significantly different. This is due to the fact that the diode or other biasing means 170 placed in series with amplifier 169 blocks any signal having a reference direction opposite to the reference direction of signal 165. In other words, a signal will reach solenoid valve 85 only when the magnitude of signal 165 is greater than the magnitude of signal 171. While the reference direction of signal 165 is shown in the drawing to be positive and that of signal 171 negative, and, therefore, diode 170 is selected to pass a positive signal, this is merely a matter of choice. That is to say, the circuitry could be designed such that signal 165 would be negative and signal 171 would be positive while diode 170 is selected to be negatively biased, i.e., to pass a negative but not a positive signal.

POWER TRANSFER

As set forth previously, CBO valve 53 has a fluid chamber 139 which may receive fluid under pressure from a line 137. The fluid entering this side of the CBO valve is delivered by the power transfer system and serves to ensure that the valve remains closed during power transfer.

The line 137, which also delivers fluid to the power transfer clutch 57, is pressurized by a pump 181 which draws fluid from a sump 183 which may be the same as sump 93. The pump 181, driven by the engine accessory train, provides this pressure when a proportional solenoid valve 185 is energized by a signal 187 directed to it. The valve 185 drives a pilot-operated relief valve 189 that is provided with hydraulic fluid from pump 181 via line 191. Valve 189 comprises a conventional pilot-operated relief valve, e.g., Vickers Inc., Part No. CG–03–B. Excess fluid is returned to sump 183 via drain lines 195 and 197.

The solenoid valve 185 may also be of the normally open or closed type. If desired, it could be the same valve as previously described valve 85, and the single valve will be selectively responsive to two signals for passage of fluid through different lines at different times. In practice, when two valves are used, it will probably prove most practical to use similarly constructed valves, e.g., both normally open.

In any case, when the valve is in its normal position, the pilot-operated relief valve 189 is positioned so that fluid moved by pump 181 passes through line 191, valve 189, and line 195 back to sump 183. When solenoid valve 185 is acted upon by signal 187, relief valve 189 is acted upon by the hydraulic fluid in line 199 between the valves. This fluid enters into line 199 from pump 181 by way of line 191 and an internal passage in valve 189. This fluid positions valve 189 in accordance with the position required by signal 187. As the repositioning of relief valve 189 causes an increase in pressure in line 191, the pressure also increases at clutch 57 and CBO valve 53. As signal 187 calls for greater power transfer, the position of valve 189 changes to further restrict the flow through lines 191 and 195 and proportionally increases the pressure in line 137.

Similar to the operation of the dynamic braking system, a relief valve 201 is situated between the region of clutch 57 pressure and sump 183 to limit clutch pressure and, thereby, the amount of torque transmitted.

The turbine inlet temperature ($T_{IT}$) sensor 41 provides a signal 211 proportional to the sensed $T_{IT}$ and this signal is fed into a temperature compensator network 213. The network introduces a lead into the signal 211 to correct for the inherent lag of the element 41 due to the time it takes the heat to soak the sensing portion thereof. The signal 215 resulting from the action of the network is fed to a summing junction 217.

In a power transfer temperature reference schedule 219, a predetermined relationship between gasifier speed ($N_G$) and turbine inlet temperature is established. The $N_G$ reading by the measuring device 29 is fed to the schedule 219 as a signal 221. Schedule 219 then creates a signal 223 which is fed into the junction 217 and is the opposite reference direction to that of signal 215. For example, signal 223 is shown to be positive while signal 215 is shown to be negative. The strength of signal 223 is determined in the manner shown in FIG. 4. When $N_G$ is at or above about 87 percent of rated $N_G$, then signal 223 will be constant and comparable to a rated $T_{IT}$ value, for example, 1,900° F. If signal 215 is also comparable to the rated $T_{IT}$ value, then signals 223 and 215 will cancel each other out at junction 217 and no power transfer can occur. If, however, signal 223 is greater than 215, power transfer may occur. As $N_G$ drops between about 87 percent and about 82 percent of rated $N_G$, signal 223 will diminish proportionally, as will the amount of torque transferred from the gasifier to the power section. At about 82 percent of rated $N_G$, signal 223 falls to zero and no power transfer is possible since only a signal biased in a reference direction which is the same as that of signal 223 will reach solenoid valve 185. This is due to the fact that a diode or other biasing means 224 placed in series with amplifier 233 effectively blocks any signal having a reference direction opposite to the reference direction of signal 223.

While the reference direction of signals 215 and 225 is shown in the drawing to be negative and that of signal 223 positive, and therefore diode 224 is selected to pass a positive signal, this is merely a matter of choice. That is to say, the circuitry could be designed such that signals 215 and 225 would be positive and signal 223 would be negative, while diode 224 is selected to be negatively biased, i.e., to pass a negative but not a positive signal.

A third signal 225, of the same reference direction as signal 215, e.g., the negative reference direction shown, is also fed into summing junction 217 from an underspeed limiter 227. Power turbine speed signal 153 is fed into limiter 227 from the speed measuring device 51 and signal 225 is of a strength according to the relationship shown in FIG. 5. When signal 153 is equivalent to more than about 70 percent of rated power turbine speed ($N_{PT}$), then signal 225 is zero and only the values of 223 and 215 determine whether or not power transfer will occur. When signal 153 drops between about 70 and 65 percent of rated $N_{PT}$, signal 225 increases at a constant rate until, at about 65 percent and all lower speeds, it is equivalent to the power transfer temperature reference value and no power transfer can occur.

In other words, a signal 187 will reach solenoid valve 185 only when the magnitude of signal 223 is greater than the combined magnitude of signals 215 and 225. Thus, unless the compensated turbine inlet temperature is less than its reference value, power turbine speed is greater than 65 percent of rated, and gasifier speed is greater than 82 percent of rated, no power transfer can possibly occur. When power turbine speed is greater than 70 percent of rated and gasifier speed is greater than 87 percent of rated, the amount of torque passed from the gasifier to the power section or load, and thus the temperature at the gasifier turbine inlet ($T_{IT}$), is controlled by the temperature at the gasifier turbine inlet ($T_{IT}$). This control system is referred to as closed-loop on gasifier turbine inlet temperature.

Signal 229 must then pass an interlock 321 which serves to ensure that power transfer and dynamic braking signals are not fed to the valves 85 and 185 at the same time and that a dynamic braking signal will always override. It is then passed through a proportional and integral amplifier 223 and amplified and then passed to diode 224 so as to become signal 187.

STARTING CONTROL

Signal 215 leaving the temperature compensating network 213 is also fed to a starting control circuit 241 which may be of any desired type to provide suitable starting characteristics for the engine. Ideally, the circuit will prevent an increase in fuel flow until a predetermined rate of temperature rise is detected. The initial starting, light-off fuel flow rate will be established at a predetermined number of pounds of fuel per hour and this rate will be maintained until a minimum rate of increase in $T_{IT}$ is detected. When this occurs, the output signal 243 which is passed to the fuel control circuit 161 will increase so as to allow an increase in fuel flow in a manner to be described.

Although the details of circuit 241 are not described here since such details, per se, do not form a part of the invention, the characteristics of automatic starting of the engine are as follows:

a. An on-off switch 245 at the operator's console is turned on, thereby allowing the energizing of a starter solenoid relay (not shown) by a signal 247 when the starter button (not shown) is pressed;
b. At approximately 20 percent of rated $N_G$, fuel begins to pass through the fuel system to the combustion chamber and ignitor is turned on;
c. When self-sustaining combustion and speed have been reached, e.g., approximately 55 percent of rated $N_G$, the starter solenoid relay and the ignitor are turned off;
d. The fuel, ignitor, and starter are turned off between steps b. and c. unless a predetermined increase in $T_{IT}$ is detected within a predetermined period of time.

Any suitable circuitry of those presently known and which will fulfill these characteristics may be utilized as the starting control circuit.

ACCELERATION LIMITER

Signal 215 is also fed to a summing junction 251 where it is combined with a signal 253 of the opposite reference direction. The temperature error, or fuel control, signal 253 is the output of an acceleration limiter temperature reference schedule 255 which receives input signals 257 and 221 from ambient temperature ($T_A$) measuring device 27 and gasifier speed ($N_G$) measuring device 29 respectively.

The temperature reference schedule 255 is a part of the acceleration limiting control system, which system will also be closed-loop on $T_{IT}$ from the time fuel is first admitted to the engine during starting (light-off) to rated gasifier speed.

Schedule 255 is an electrical network which produces a voltage, as a function of gasifier speed ($N_G$) biased by ambient temperature ($T_A$), that is proportional to the maximum temperature ($T_{IT}$) that may be permitted in the engine at that $N_G$. Higher temperatures ($T_{IT}$) would result in compressor surge and/or damage to the hot parts of the engine by weakening them with thermal shocks or over-temperature.

The acceleration limiting control system prevents excessive fuel flow from going to the engine during acceleration so as to avoid the problems associated with high temperatures. Since the acceleration limiter allows the addition of fuel in inverse proportion to $T_{IT}$, a parameter significantly affected by the fuel flow, the control is closed-loop on $T_{IT}$.

The fuel flow is decreased at a rate which is in proportion to the amount that $T_{IT}$ is driven above the reference or limiting value for a given $N_G$ as determined in schedule 255 in the manner shown in FIG. 3, and thus the closed-loop control is proportional.

The rate of reduction of fuel flow is controlled as a function of time when the $T_{IT}$ reference is exceeded; thus the closed-loop control is also integral. Therefore, as a unit, the control is integral and proportional.

Ambient temperature signal 257 is fed into schedule 255 so as to bias the limiting turbine inlet temperature up and down as a function of ambient temperature in order to keep the compressor out of surge during acceleration of the engine. Thus, as shown in FIG. 3, different reference signal lines are provided by $T_{A1}$ and $T_{A2}$ for a single $N_G$ value, although the upper constant value, e.g., 2,050°F., will remain fixed regardless of $T_A$.

Summarizing thus far, temperature reference schedule 255 and temperature compensator network 213 provide an acceleration limiting signal 261 which relates $T_{IT}$ as a function of $N_G$. This is biased by $T_A$ except that the top limit is fixed regardless of $T_A$. For purposes of illustration, $T_{IT}$ will be a maximum of 1,900° F. during steady state operation and a maximum of 2,050° F. during acceleration.

FUEL CONTROL

Signal 159 from the power turbine governor, 243 from the starting control circuit, and 261 from the acceleration limiter are all directed to the fuel control circuit 161.

The specific circuitry utilized in the fuel control circuit is not, per se, considered to be a part of this invention and any of the presently known control circuits can be utilized so long as the necessary functions and results are achieved.

The signal 159 which is taken from the power turbine governor 151 will tend to establish a fuel flow proportionately between the fixed minimum fuel flow and the acceleration limiter fuel flow (signal 261).

Two signals generated from within the fuel control circuit will override signal 159 when necessary. The first is from a gasifier topping or overspeed governor (not shown) with a fixed speed reference which will decrease the fuel flow at a predetermined rate when $N_G$ exceeds 100 percent of rated speed. The second is a gasifier idle or minimum speed governor (not shown) which prevents the under-speeding of the gasifier during deceleration. When $N_G$ is less than about 60 percent of rated speed, the minimum speed governor will increase the fuel flow to combustion chamber 37 by a predetermined amount. As shown in FIG. 2 therefore, the fuel control circuit must receive signal 221 from $N_G$ measuring device 29.

Signal 261, the acceleration limiting signal which protects the engine against thermal shock at low speed, provides surge protection at medium speed, and protects against over temperature at high speed; signal 243, the light-off detector signal which includes the rate of change of temperature function and is non-effective after starting is completed; and signal 159, the governing or major operational signal, as modified by the gasifier speed control devices; all are directed through what is commonly referred to as a "least-gate" system (not shown) which selects the one signal which is calling for the minimum amount of fuel flow at any given instant.

The selected signal is suitably amplified to become signal 301 which is directed to fuel meter 303, a part of the fuel system 39. Signal 301 positions the valve in meter 303 such that the required amount of fuel passes from meter inlet 305 to the outlet 307 which delivers the fuel to combustion chamber 37 through an on-off solenoid valve 309. The valve is responsive to actuation of start control 241. Excess fuel delivered to the meter is returned to its source via a conduit 311.

GENERAL OPERATION

In FIG. 7 there is shown a graphical illustration of a plot of power turbine speed as a percentage of rated power turbine speed versus gasifier speed as a percentage of rated gasifier speed. The values shown on the graph and discussed hereafter must be considered to be merely illustrative and not as restrictive of the scope of the invention.

a. Dynamic Braking

At 60 percent of rated gasifier speed, a line J is shown which is determined by the gasifier underspeed or idle governor. This governor, as stated previously, serves to restrict the minimum gasifier speed to about 60 percent of rated, or, in other words, about 5 percent above that speed required for self-sustained operation.

The line E drawn at 100 percent of rated gasifier speed is determined by the gasifier overspeed or topping governor. When $N_G$ exceeds 100 percent of rated, this governor will reduce the fuel signal 301 until $N_G$ is down to approximately 100 percent of rated speed again.

As the engine accelerator calls for increased or decreased output speed, a constant width "V", shown coincident with lines F and I and extending between lines J and E will move to the right or left on the graph respectively, although lines F and I themselves are stationary. The width of the "V" will always be 15 percent of rated $N_{PT}$ at line E regardless of the horizontal position it assumes on the graph. That portion shown as coincident with line F, from intersection FE to FJI, will always be 7½ percent of rated $N_{PT}$ and that part coincident with line I from FJI to IE will also be 7½ percent of rated $N_{PT}$.

The line F portion of the "V" is a fuel droop line which is determined by the power turbine governor 151 and the line I portion represents the dynamic brake operating line with the accelerator fully released. As the actual power turbine speed (at 51) exceeds the demanded power turbine speed (at 157) by amounts between 0 – 7½ percent (FE and FJI) of rated power turbine speed, the power turbine speed error signal 159 will cause a decrease in fuel signal 301 until the fuel flow is down to a minimum and the gasifier speed is down to 60 percent of rated (line J). When the engine operating point reaches the 7½ percent error point (F-JI), signal 159 causes the brake reference schedule 163 to emit a signal 165 energizing the braking proportional solenoid valve 85. When the operating point reaches the 15 percent error position (IE) valve 85 will be fully energized, thereby driving the gasifier to its rated speed even though fuel flow is at a minimum. As the signal progresses toward 15 percent, the CBO valve 53 is opened in the manner previously described.

As the speed difference between the power turbine and gasifier driven elements decreases below the exemplory 440 rpm, slip detector 173 begins to cause a reduction in the braking as described earlier until, at about the exemplory 220 rpm difference (slip), no braking occurs.

At steady state operation, the ideal operating point of the engine is at FE. When, during braking, the operating point is on the right leg of the "V", as symbolized by line I, and the "V" moves across line G, slip detector 173 begins to cause a reduction in the signal leaving summing junction 167 until, at line H, the dynamic braking ceases altogether. Line H represents the point of 5 percent slip in clutch 55 and line K represents the braking CLUTCH zero slip line.

Thus, the area bounded by Lines E, I, J, and G, as illustrated in their positions in FIG. 7, is the island of operation of full dynamic braking and it is plotted as a bivariate function of the gasifier and power turbine speeds. This area remains constant although the "V" may move to the left from the position shown. To the left of line G, the braking clutch is proportionally de-energized until, the operating point crosses line H, the braking system is completely deactivated.

b. Power Transfer

Although the ideal point of engine operation is at FE, it often occurs that it falls instead to a point somewhere below that. This occurs, for example, when a reduced load operation allows a fuel input insufficient to maintain 100 percent of rated $N_G$. As gasifier speed drops below 100 percent of rated (line E) during normal operation, it becomes desirable to have power transfer occur so as to maintain the operating efficiency as high as possible by keeping $T_{IT}$ as close to its designed values as possible.

As shown in FIG. 7, the shaded area bounded by A, C, E and F is the area in which full power transfer can occur if engine operation falls within the boundaries. Anywhere within this area, the power transfer signal 229 will be such that $T_{IT}$ will be controlled to its maximum steady state reference value, e.g., 1,900° F., due to the fact that the gasifier will be required to supply a portion of the output torque through the modulation of the power transfer system up to and including maximum torque transmitted.

If the engine operation should fall within the area A, C, D, B, F, power transfer can still occur, but at a proportionately reduced rate of torque transmitted so that $T_{IT}$ is controlled to values proportionally less than the maximum steady state reference value.

Lines A and B are determined by the power transfer temperature reference schedule 219 in the manner taught in the section entitled POWER TRANSFER above. Lines C and D are determined by the underspeed limiter 227 as also described in that section.

Line E is determined by the gasifier topping governor, and line F is determined by the power turbine governor 151 which limits the fuel signal 159 when $N_{PT}$ exceeds approximately 100 percent of rated speed.

In summary, power transfer can occur anywhere within area B, D, E, F, but only within area A, C, E, F, can it occur so as to cause the gasifier to be so driven that $T_{IT}$ stays at the maximum steady state reference value. Within the remainder of the area, power transfer can still occur, but at a proportionately reduced rate so that signal 229 allows a sufficient amount of work to be done by the gasifier to maintain $T_{IT}$ at a proportionately lower temperature.

Thus the applicants have provided an engine which is capable of superior performance over those presently known due to the utilization of closed-loop modulated control of power transfer and dynamic braking based upon the parameters of gasifier turbine inlet temperature, gasifier speed, and power turbine speed. The dynamic braking system disclosed has been improved by the use of a modulated compressor blow-off valve which acts to cool the heat exchanger so as to obviate the "heat sink" effect thereof during braking.

While the illustration and description have shown one preferred embodiment and a few suggested modifications of the invention, the concepts herein are capable of variation and modification within the scope of the following claims.

What is claimed is:

1. In a free turbine engine, the process of selectively transferring power from a gasifier section of said engine to a power section thereof including the step of controlling the gasifier turbine temperature to a predetermined temperature as a function of the actual temperature at said gasifier turbine, thereby controlling the speed of said gasifier section, by providing an actual turbine inlet temperature signal having a reference direction, providing a power transfer reference signal derived from the speed of said gasifier section and having a reference direction opposite to the reference direction of the turbine inlet temperature signal, summing the turbine inlet temperature signal and the power transfer reference signal, and transferring torque from said gasifier section to said power section in response to the summation of said turbine inlet temperature signal and said power transfer reference signal only when the summation has a reference direction which is the same as the reference direction of the power transfer reference signal.

2. The process of claim 1 including the further steps of providing a power turbine reference signal derived from the speed of the power turbine and having a reference direction opposite to the reference direction of the power transfer reference signal, summing said power turbine reference signal with said turbine inlet temperature signal and said power transfer reference signal, and transferring torque from said gasifier section to said power section only when the summation has a reference direction which is the same as the reference direction of the power transfer reference signal.

3. The process of claim 1 including the step of compensating the signal generated by the actual temperature at said gasifier turbine for heat soak lag.

4. The process of claim 1 wherein the step of transferring torque is performed by the steps of varying the position of a valve in response to said summation, thereby actuating a torque transfer means.

5. The process of claim 1 including the step of blocking the transmission of torque from said gasifier section to said power section when torque is required to be transferred from said power section to said gasifier section.

6. The process of claim 1 wherein the reference direction of said turbine inlet temperature signal is negative and the reference direction of the power transfer reference signal is positive whereby torque is transferred from the gasifier section to the power section only when the summation of said turbine inlet temperature signal and said power transfer reference signal has a positive reference direction.

7. The process of claim 6 including the step of blocking the transmission of torque from said gasifier section to said power section when torque is required to be transferred from said power section to said gasifier section.

8. The process of claim 1 including the step of transferring torque from said power section to said gasifier section when the engine control system undergoes an electrical power loss.

9. In a free turbine engine having a gasifier section and a power section, means selectively transferring power from said gasifier section to said power section, control means for said power transfer means, circuitry whereby said control means operates closed-loop on gasifier turbine temperature, and means for measuring said gasifier turbine temperature and emitting a $T_G$ signal in relation thereto, lag compensating means to receive said $T_G$ signal and correct it for heat soak lag in said measuring and emitting means, thereby producing a corrected $T_G$ signal, said corrected $T_G$ signal having a reference direction, means for measuring gasifier section speed and emitting an $N_G$ signal having a reference direction opposite to that of the $T_G$ signal, means for summing said corrected $T_G$ signal and said $N_G$ signal and transferring power only when the summation has a reference direction which is the same as the direction of the power transfer reference signal.

10. In the engine of claim 9, means for transferring power from said power section to said gasifier section upon loss of electrical power in the engine control circuitry.

11. The engine of claim 9 wherein means are provided for measuring said power section speed and emitting an $N_{PT}$ signal in relation thereto, and underspeed limiter means receiving said $N_{PT}$ signal and emitting a bias signal when said $N_{PT}$ signal is smaller than a predetermined value.

12. The engine of claim 11 wherein said corrected $T_G$ signal and said bias signal are added together and subtracted from said power transfer signal at a summing junction and the resultant power transfer signal is passed through an amplifier.

13. The engine of claim 12 wherein said amplifier is a proportional and integral amplifier which passes the amplifier resultant power transfer signal to a solenoid valve.

14. The engine of claim 13 wherein said solenoid valve is a proportional solenoid valve which acts upon a pilot-operated relief valve, thereby varying the pressure exerted on a torque transmittal means in said power transfer means.

15. The engine of claim 9 wherein said corrected $T_G$ signal and said power transfer signal are added together at a summing junction and the resultant power transfer signal is passed through an amplifier to a valve system and means varying the torque transmitted by said power transfer means in accordance with the strength of said resultant power transfer signal.

16. The engine of claim 15 wherein said power transfer means includes a modulatable, fluid-actuated, torque transmittal means.

* * * * *